(12) United States Patent
Nakamura et al.

(10) Patent No.: US 10,023,284 B1
(45) Date of Patent: Jul. 17, 2018

(54) OUTBOARD MOTOR

(71) Applicant: YAMAHA HATSUDOKI KABUSHIKI KAISHA, Iwata-shi, Shizuoka (JP)

(72) Inventors: Takafumi Nakamura, Shizuoka (JP); Yuki Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/831,459

(22) Filed: Dec. 5, 2017

(30) Foreign Application Priority Data

Mar. 2, 2017 (JP) ................. 2017-039360

(51) Int. Cl.
*B63H 21/17* (2006.01)
*B63H 21/20* (2006.01)
*B63H 20/32* (2006.01)
*B63H 20/14* (2006.01)

(52) U.S. Cl.
CPC ............ *B63H 21/17* (2013.01); *B63H 21/20* (2013.01); *B63H 20/14* (2013.01); *B63H 20/32* (2013.01)

(58) Field of Classification Search
CPC ................................ B63H 21/17; B63H 21/20
See application file for complete search history.

(56) References Cited

U.S. PATENT DOCUMENTS

| | | | | |
|---|---|---|---|---|
| 3,218,401 A * | 11/1965 | Root | ...................... | H01H 21/02 200/11 C |
| 5,390,506 A * | 2/1995 | Sogabe | .................... | F24F 11/89 62/175 |
| 6,087,735 A * | 7/2000 | Nakamura | .............. | B60L 11/12 123/179.1 |
| 6,173,574 B1 * | 1/2001 | Obayashi | ............... | B60K 6/365 60/706 |
| 2009/0212740 A1 * | 8/2009 | Felps | ................. | G01R 31/3606 320/134 |
| 2010/0033130 A1 * | 2/2010 | Mizushima | ........... | B63H 23/24 320/126 |
| 2013/0312503 A1 | 11/2013 | Terada | | |
| 2017/0291672 A1 * | 10/2017 | Maejima | ................. | B60L 11/12 |
| 2018/0138850 A1 * | 5/2018 | Bailey | .................... | B63H 21/14 |
| 2018/0141631 A1 * | 5/2018 | Davis | ..................... | B63H 20/14 |

FOREIGN PATENT DOCUMENTS

JP         2013-245560 A         12/2013

* cited by examiner

*Primary Examiner* — Stephen P Avila
(74) *Attorney, Agent, or Firm* — Keating & Bennett, LLP

(57) ABSTRACT

An outboard motor includes an electric power source, a mechanical power source auxiliary machine, an electric circuit, an electric supply port, and a switch. The mechanical power source auxiliary machine assists driving a mechanical power source. The electric circuit electrically connects the electric power source and the mechanical power source auxiliary machine. The electric supply port is electrically connected to the electric power source through the electric circuit, and supplies an electric power to an accessory device to be connected thereto. The switch is disposed between the electric power source and the electric supply port in the electric circuit, and is switchable between an on state and an off state. The switch allows a flow of an electric current when switched to the on state, and interrupts the flow of the electric current when switched to the off state.

12 Claims, 7 Drawing Sheets

OUTBOARD MOTOR

CROSS REFERENCE TO RELATED APPLICATIONS

This application claims the benefit of priority to Japanese Patent Application No. 2017-039360 filed on Mar. 2, 2017. The entire contents of this application are hereby incorporated herein by reference.

BACKGROUND OF THE INVENTION

1. Field of the Invention

The present invention relates to an outboard motor.

2. Description of the Related Art

Outboard motors include a mechanical power source and a mechanical power source auxiliary machine for driving the mechanical power source. For example, an outboard motor described in Japan Laid-open Patent Application Publication No. 2013-245560 includes an engine and engine auxiliary machines for driving the engine. For example, the engine auxiliary machines are an ECU (Engine Control Unit), a fuel injection device, an ignition device and so forth. The ECU is a computer that includes a computing unit such as a CPU. The ECU controls the output of the engine by controlling the fuel injection device and the ignition device.

The engine auxiliary machines such as the ECU, the fuel injection device and the ignition device are connected to an electric power source installed in the outboard motor, and are supplied with electric power from the electric power source. For example, the electric power source is a battery installed in the outboard motor. The outboard motor includes an electric power generator to be driven by the mechanical power source. Electric power generated by the electric power generator is stored in the battery. On the other hand, in an outboard motor without a battery, the electric power generator functions as an electric power source, and electric power generated by the electric power generator is supplied to the engine auxiliary machines.

There are chances that electric power supply to an accessory device is required on a watercraft. For example, if a mobile device such as a mobile phone can be charged on a watercraft, this is convenient for a person on board. To achieve this, it can be assumed to supply electric power to the accessory device from the electric power source of the outboard motor.

However, it is required to limit electric power to be supplied to the accessory device. This is because it is required to reliably supply electric power to the mechanical power source auxiliary machines for driving the mechanical power source. A fuse can be assumed as a means for achieving the above. Specifically, when electric power supplied to the accessory device becomes excessive, the fuse is blown such that the electric power supply to the accessory device is interrupted. Accordingly, excessive electric power supply to the accessory device can be suppressed, and electric power can be reliably supplied to the mechanical power source auxiliary machines.

However, as described above, when electric power supply to the accessory device is interrupted by the blown fuse, it is required to replace the blown fuse with a new one in order to supply electric power again to the accessory device. However, it is not easy to open a cowl of the outboard motor and replace the fuse while the watercraft is located on the water. This results in a drawback that electric power cannot be supplied to the accessory device until the watercraft returns to a port.

SUMMARY OF THE INVENTION

Preferred embodiments of the present invention reliably supply electric power to a mechanical power source auxiliary machine that assists driving a mechanical power source in an outboard motor and to supply electric power to an accessory device easily and reliably on a watercraft.

An outboard motor according to a preferred embodiment of the present invention includes a mechanical power source, a drive shaft, a propeller shaft, an electric power source, a mechanical power source auxiliary machine, an electric circuit, an electric supply port, and a switch. The drive shaft is driven by the mechanical power source, and extends downwardly from the mechanical power source. The propeller shaft is connected to the drive shaft, and extends in a direction intersecting an axis of the drive shaft. The mechanical power source auxiliary machine assists driving the mechanical power source. The electric circuit electrically connects the electric power source and the mechanical power source auxiliary machine. The electric supply port is electrically connected to the electric power source through the electric circuit, and supplies an electric power to an accessory device to be connected thereto. The switch is disposed between the electric power source and the electric supply port in the electric circuit. The switch is switchable between an on state and an off state. The switch allows a flow of an electric current when switched to the on state. The switch interrupts the flow of the electric current when switched to the off state. The switch is switched from the on state to the off state due to an excessive electric current. The switch is returnable from the off state to the on state.

In an outboard motor according to a preferred embodiment of the present invention, electric power is able to be supplied to the accessory device by connecting the accessory device to the electric supply port. Additionally, when electric power supply to the accessory device becomes excessive, the switch is switched from the on state to the off state such that electric power supply to the accessory device is interrupted. Accordingly, electric power is reliably supplied to the mechanical power source auxiliary machine. Moreover, the switch is returnable from the off state to the on state. Therefore, electric power is supplied again to the accessory device by switching the switch from the off state to the on state without replacing the switch. Accordingly, electric power is supplied to the accessory device easily and reliably on a watercraft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
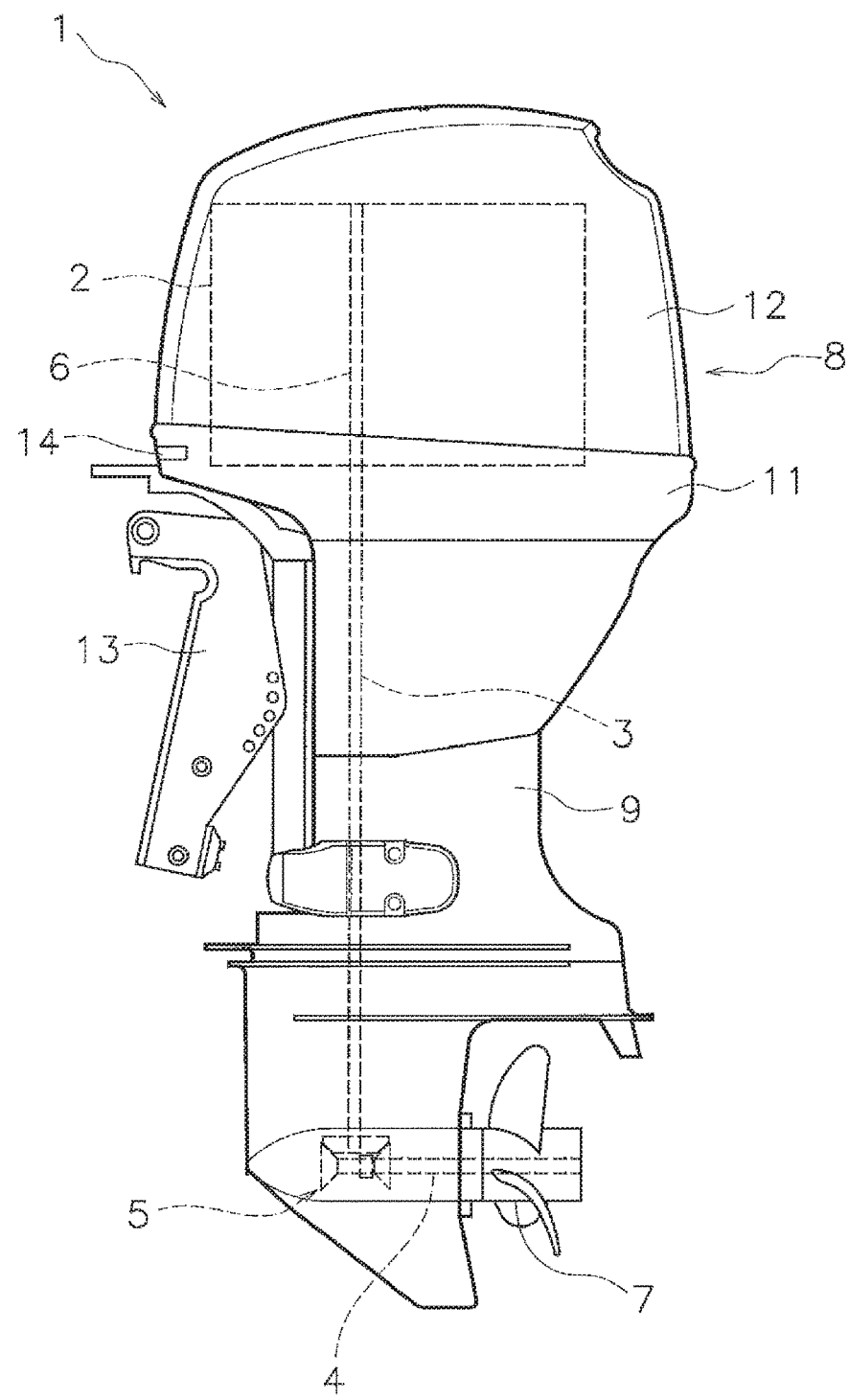
FIG. 1 is a side view of an outboard motor according to a preferred embodiment of the present invention.

Preferred embodiments of the present invention will be hereinafter explained with reference to drawings. FIG. 1 is a side view of an outboard motor 1 according to a preferred embodiment of the present invention. The outboard motor 1 includes a mechanical power source 2, a drive shaft 3, a propeller shaft 4, and a shift mechanism 5.

The mechanical power source 2 generates a thrust to propel a watercraft. In the present preferred embodiment, the mechanical power source 2 is an engine, for example. The mechanical power source 2 includes a crankshaft 6. The crankshaft 6 extends in the vertical direction. The drive shaft 3 is connected to the crankshaft 6. The drive shaft 3 extends in the vertical direction. The drive shaft 3 extends downwardly from the mechanical power source 2. It should be noted that the drive shaft 3 may be coaxial to, side by side with, or perpendicular or substantially perpendicular to the crankshaft 6.

The propeller shaft 4 extends in the back-and-forth direction. The propeller shaft 4 is connected to the drive shaft 3 through the shift mechanism 5. A propeller 7 is connected to the propeller shaft 4. The shift mechanism 5 switches a rotational direction of power to be transmitted from the drive shaft 3 to the propeller shaft 4. For example, the shift mechanism 5 includes a plurality of gears and a clutch that changes the meshing of gears.

The outboard motor 1 includes a cowl 8 and a housing 9. The cowl 8 accommodates the mechanical power source 2. The cowl 8 includes a bottom cowl 11 and a top cowl 12. The top cowl 12 is disposed above the bottom cowl 11. The top cowl 12 is detachably attached to the bottom cowl 11.

The housing 9 is disposed below the cowl 8. The housing 9 accommodates the drive shaft 3 and the propeller shaft 4. The outboard motor 1 includes a bracket 13. The outboard motor 1 is attached to the watercraft through the bracket 13.

The outboard motor 1 includes an electric supply port 14. The electric supply port 14 is attached to the outer surface of the bottom cowl 11. More specifically, the electric supply port 14 is preferably attached to the front surface of the bottom cowl 11.

Figure 2:
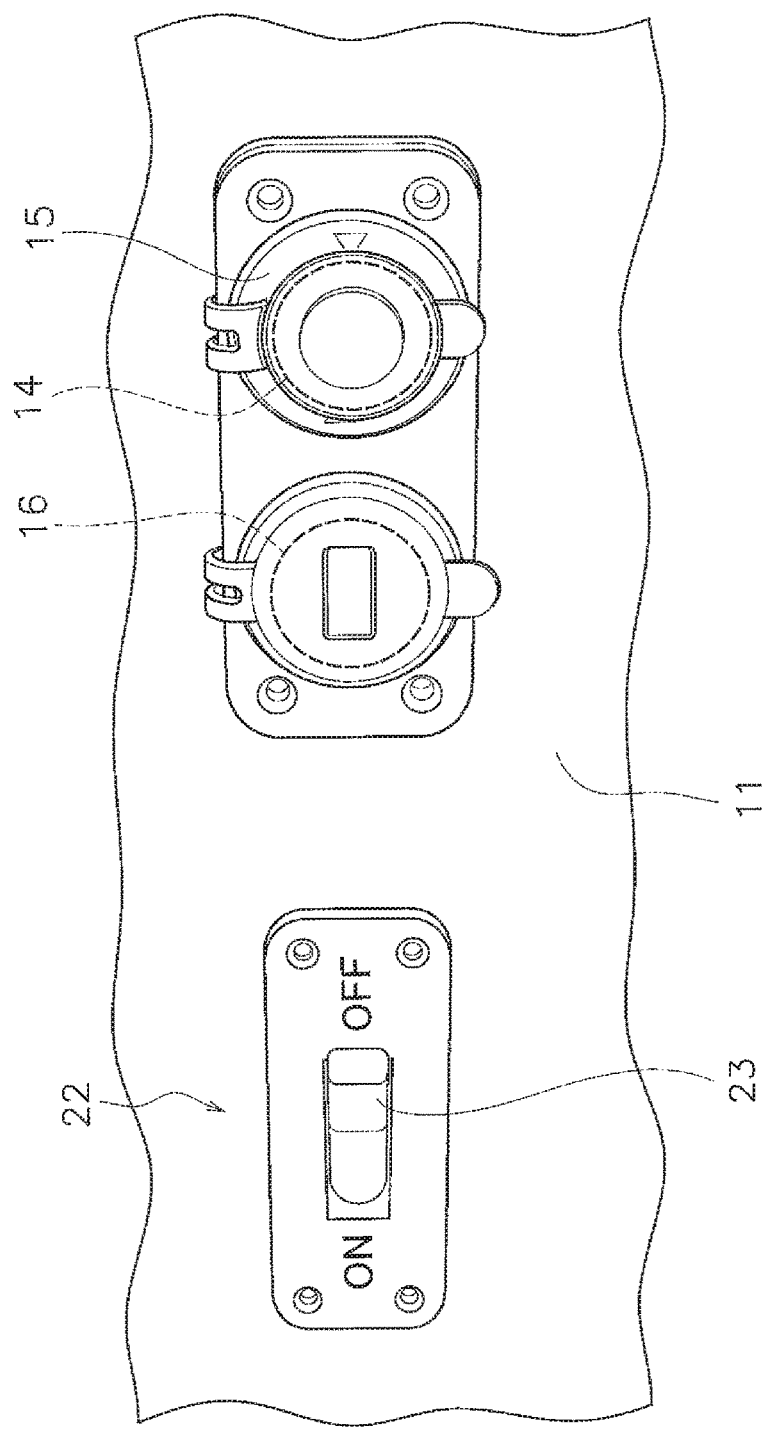
FIG. 2 is a diagram showing a front portion of a bottom cowl.

FIG. 2 is a diagram showing the front surface of the bottom cowl 11. As shown in FIG. 2, a waterproof cap 15 is attached to the electric supply port 14. The waterproof cap 15 is detachably attached to the electric supply port 14.

It should be noted that in FIG. 2, another electric supply port 16 is disposed on the front surface of the bottom cowl 11. However, the number of electric supply ports is not limited to two, and alternatively, may be one or may be three or more.

The electric supply port 14 supplies electric power to an accessory device 100 (see FIG. 4) to be connected thereto. The electric supply port 14 is a so-called accessory socket.

Figure 3:
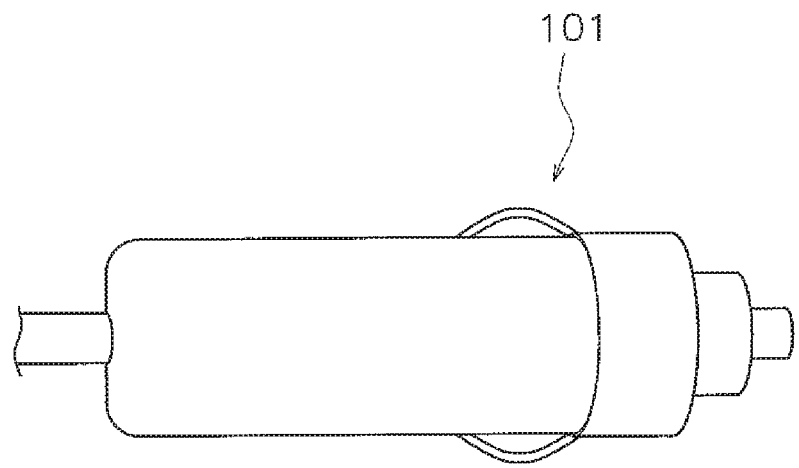
FIG. 3 is a diagram showing an example of a connector plug of an accessory device.

The accessory device 100 is connected to the electric supply port 14 through, for instance, a connector plug 101 shown in FIG. 3 (see e.g., ISO 4165, JIS D 5807-91, SAE J563, etc.). For example, the accessory device 100 may be a mobile device such as a feature phone or a smartphone, or alternatively, an electric charger for the mobile device. The accessory device 100 may be an audio or visual device such as a TV set or a DVD player. Alternatively, the accessory device 100 may be another type of device to be driven by electric power.

Figure 4:
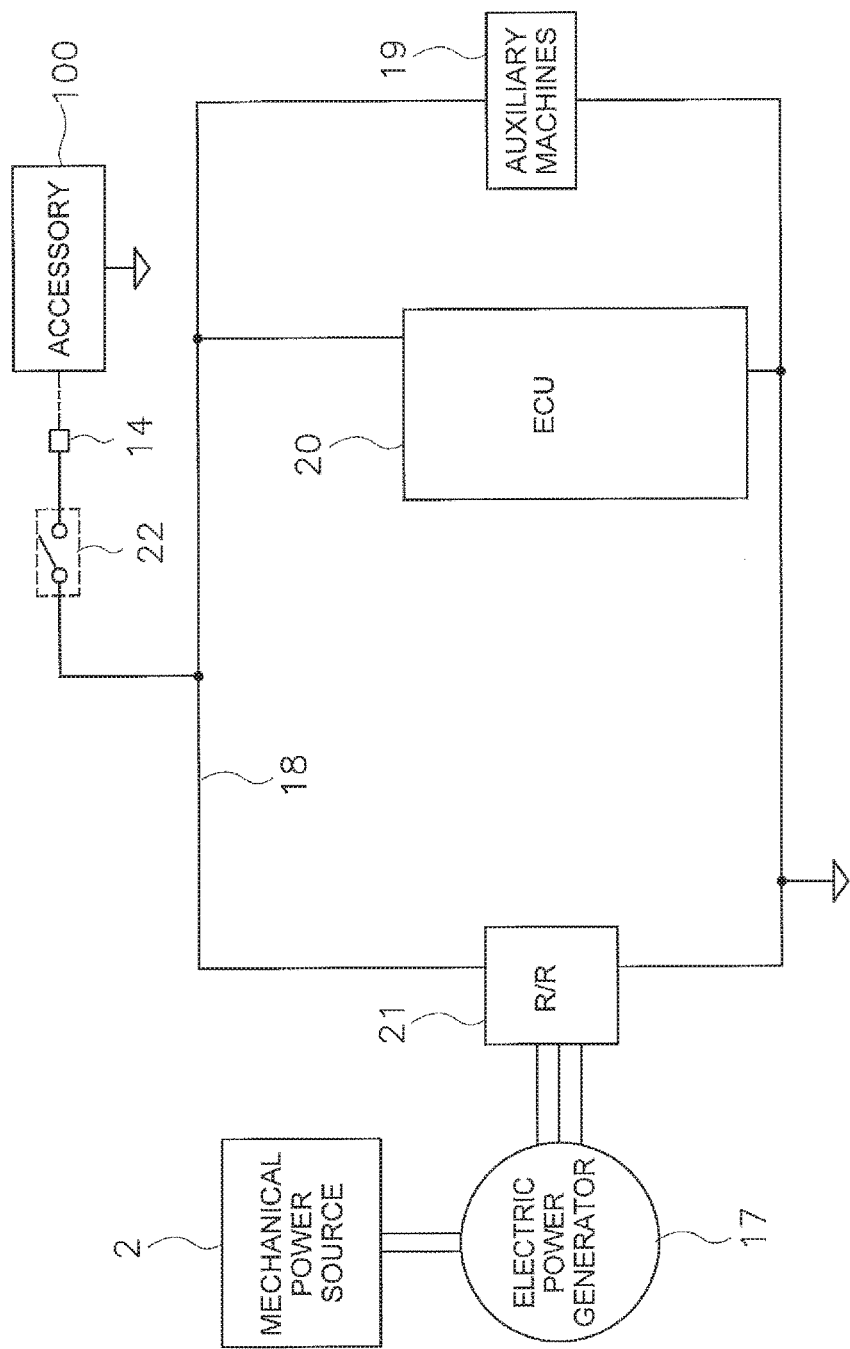
FIG. 4 is a schematic diagram showing an electric system of an outboard motor according to a first preferred embodiment of the present invention.

FIG. 4 is a schematic diagram showing an electric system of the outboard motor 1 according to a first preferred embodiment of the present invention. As shown in FIG. 4, the outboard motor 1 includes an electric power generator 17. The electric power generator 17 is connected to the mechanical power source 2. The electric power generator 17 generates electric power when driven by the mechanical power source 2.

The outboard motor 1 includes an electric circuit 18, mechanical power source auxiliary machines 19, and an ECU 20. The mechanical power source auxiliary machines 19 are devices that assist driving the mechanical power source 2. For example, the mechanical power source auxiliary machines 19 include a fuel injection device, an ignition device, and so forth.

The ECU 20 controls the mechanical power source 2. For example, the ECU 20 includes a computing unit such as a CPU and memory storages such as a RAM and a ROM. The ECU 20 controls the mechanical power source 2, for instance, such that the output rotational velocity of the mechanical power source 2 becomes a desired target value. The ECU 20 controls fuel injection by the fuel injection device. The ECU 20 controls the timing of ignition by the ignition device.

The electric circuit 18 electrically connects the electric power generator 17 to the mechanical power source auxiliary machines 19 and the ECU 20. The electric circuit 18 includes a rectifier/regulator 21. Electric power generated by the electric power generator 17 is supplied to the mechanical power source auxiliary machines 19 and the ECU 20 through the electric circuit 18. The electric power generator 17 and the electric supply port 14 are electrically connected through the electric circuit 18. The electric power generated by the electric power generator 17 is supplied to the electric supply port 14 through the electric circuit 18.

The outboard motor 1 according to the present preferred embodiment is a battery-less outboard motor without any battery. Therefore, the electric power generator 17 defines and functions as an electric power source that supplies electric power to the mechanical power source auxiliary machines 19, the ECU 20, and the electric supply port 14.

The outboard motor 1 includes a switch 22. The switch 22 is located between the electric power generator 17 and the electric supply port 14 in the electric circuit 18. The switch 22 is switchable between an on state and an off state. The on state allows the flow of electric current, whereas the off state interrupts the flow of electric current. The switch 22 is switched from the on state to the off state due to an excessive electric current. In other words, when the electric current flowing into the switch 22 is a predetermined value or more, the switch 22 is turned to the off state.

In the present preferred embodiment, the switch 22 includes a circuit breaker. For example, the switch 22 includes an electromagnet and a pair of contacts. When the electric current flowing into the electromagnet is the predetermined value or more, the pair of contacts are separated by the electromagnetic force of the electromagnet. Accordingly, the switch 22 is turned to the off state.

As shown in FIG. 2, the switch 22 includes an operating member 23. The operating member 23 manually switches the switch 22 from the off state to the on state. A user returns the switch 22 from the off state to the on state by manually moving the operating member 23 from an off position to an on position.

The operating member 23 is preferably attached to the front surface of the bottom cowl 11. In other words, the operating member 23 is attached to the cowl 8 so as to be accessible from the outside of the cowl 8. The operating member 23 is attached, together with the electric supply port 14, to the front surface of the bottom cowl 11. It should be noted that the operating member 23 may be disposed at a different location from the electric supply port 14.

In the outboard motor 1 according to the present preferred embodiment, electric power is supplied to the accessory device 100 by connecting the accessory device 100 to the electric supply port 14. Additionally, when electric power supplied to the accessory device 100 becomes excessive, the switch 22 is switched from the on state to the off state such that the electric power supply to the accessory device 100 is interrupted. Accordingly, the amount of electric power supplied to the accessory device 100 is limited, and electric power is reliably supplied to the mechanical power source auxiliary machines 19.

The switch 22 is returnable from the off state to the on state. Therefore, electric power is supplied again to the accessory device 100 by switching the switch 22 from the off state to the on state without detaching the cowl 8 and then replacing the switch 22. Accordingly, electric power is supplied to the accessory device 100 easily and reliably on the watercraft.

Preferred embodiments of the present invention have been explained above. However, the present invention is not limited to the above-described preferred embodiments, and a variety of changes can be made without departing from the gist of the present invention.

The mechanical power source 2 is not limited to the engine, and may be another type of device such as an electric motor. The attachment location for the electric supply port 14 is not limited to the bottom cowl 11, and may be another location such as the top cowl 12 or the housing 9. The attachment location for the operating member 23 of the switch 22 is not limited to the bottom cowl 11, and may be another location such as the top cowl 12, the housing 9, or a tiller handle.

The electric supply port 14 is not limited to the accessory socket, and may be another type of connection port such as a USB (Universal Serial Bus).

Figure 5:
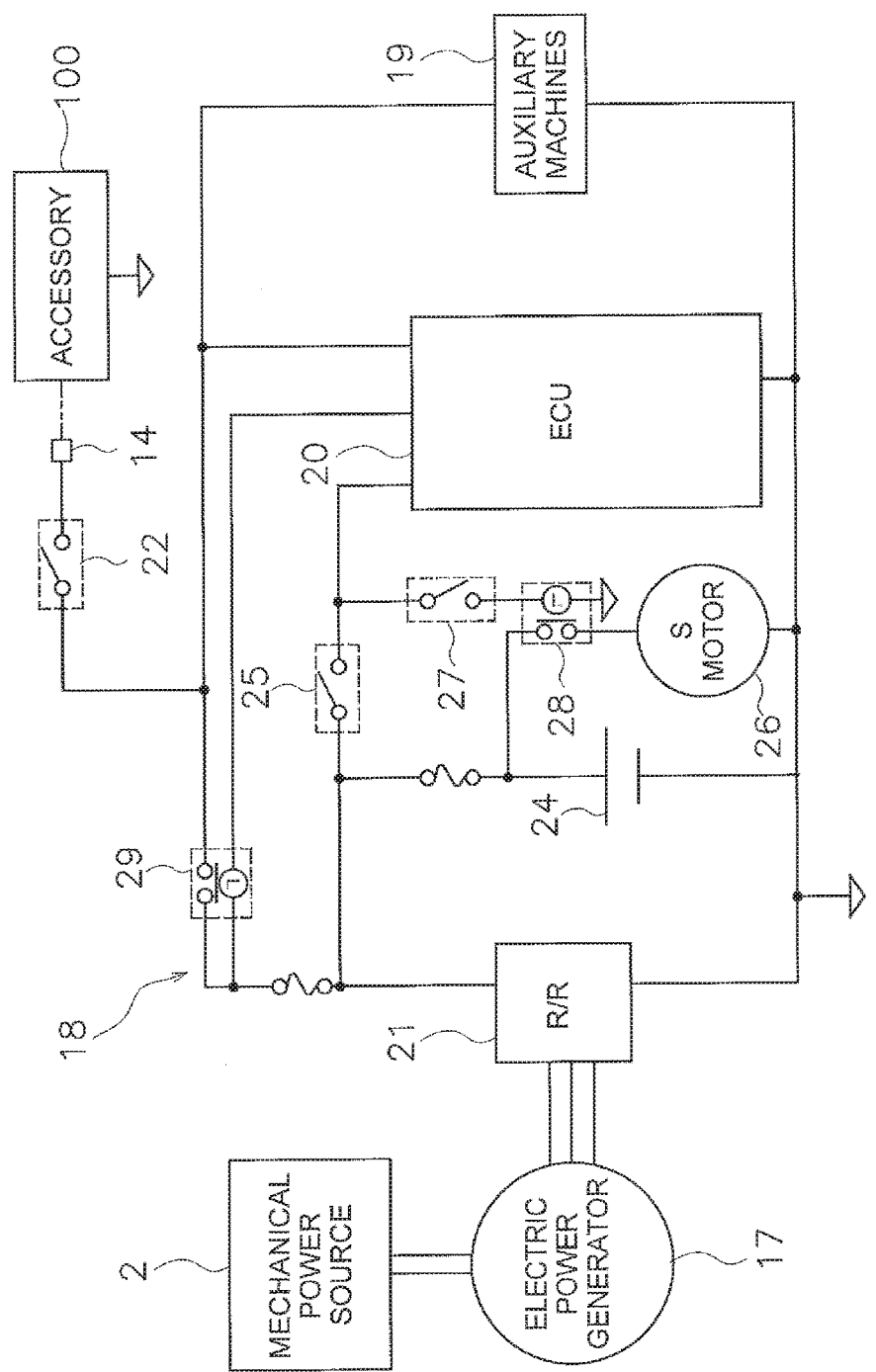
FIG. 5 is a schematic diagram showing an electric system of an outboard motor according to a second preferred embodiment of the present invention.

In the above-described preferred embodiments, the outboard motor 1 is preferably a battery-less type. However, the outboard motor 1 may include a battery. FIG. 5 is a schematic diagram showing an electric system of the outboard motor 1 according to a second preferred embodiment of the present invention. As shown in FIG. 5, the outboard motor 1 according to the second preferred embodiment includes a battery 24. The battery 24 is connected to the electric power generator 17 through the electric circuit 18. The battery 24 is charged by electric power from the electric power generator 17. The battery 24 defines and functions as an electric power source that supplies electric power to the electric supply port 14, the ECU 20, and the mechanical power source auxiliary machines 19.

In the outboard motor 1 according to the second preferred embodiment, the electric circuit 18 includes a main switch 25. When the main switch 25 is turned to the on state, electric power is supplied to the ECU 20 from the battery 24. The outboard motor 1 includes a starter motor 26. The starter motor 26 is driven when supplied with the electric power from the battery 24. The starter motor 26 starts the mechanical power source 2.

The electric circuit 18 includes a starter switch 27 and a starter relay 28. When the main switch 25 and the starter switch 27 are turned to the on state, the starter relay 28 becomes a connected state such that electric power is supplied to the starter motor 26 from the battery 24. Accordingly, the mechanical power source 2 is started.

The electric circuit 18 includes a main relay 29. When the main switch 25 is turned to the on state, the main relay 29 becomes a connected state. When the main relay 29 becomes the connected state, electric power is supplied from the battery 24 to the mechanical power source auxiliary machines 19 and the electric supply port 14.

The outboard motor 1 according to the second preferred embodiment explained above also achieves advantageous effects similar to those achieved by the outboard motor 1 according to the first preferred embodiment.

Figure 6:
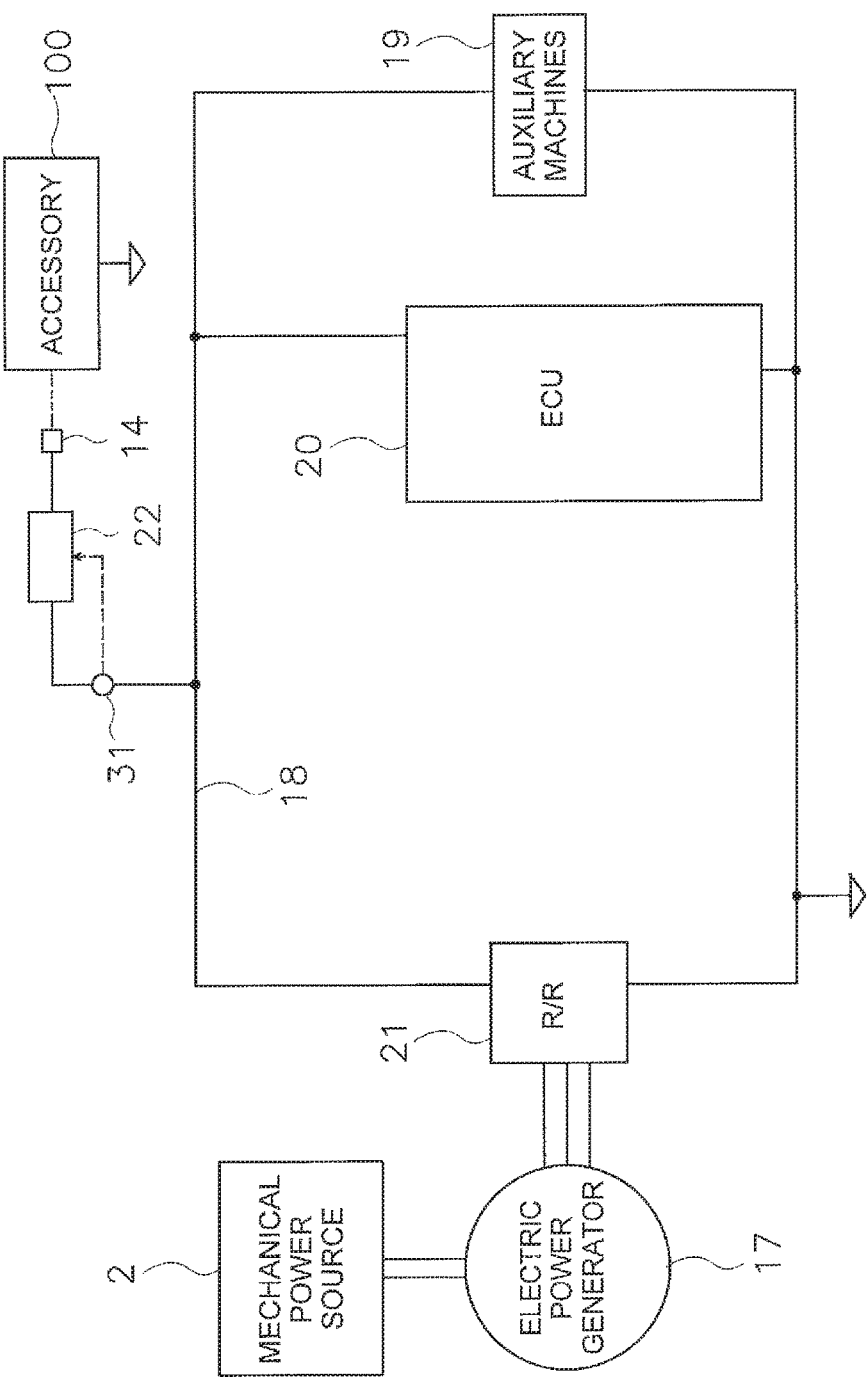
FIG. 6 is a schematic diagram showing an electric system of an outboard motor according to a third preferred embodiment of the present invention.

In the above-described preferred embodiments, the switch 22 is preferably a circuit breaker that is manually returned from the off state to the on state. However, the switch 22 may be another type of switch. For example, the switch 22 may be automatically switched between the on state and the off state in accordance with the value of electric current. FIG. 6 is a schematic diagram showing an electric system of the outboard motor 1 according to a third preferred embodiment of the present invention.

As shown in FIG. 6, the outboard motor 1 according to the third preferred embodiment includes an electric current sensor 31. The electric current sensor 31 detects the value of electric current in the electric circuit 18 to be supplied to the accessory device 100. The electric current sensor 31 inputs a signal to the switch 22 in accordance with the detected value of electric current. The switch 22 is automatically switched between the on state and the off state in accordance with the signal inputted thereto from the electric current sensor 31. The switch 22 may be, for instance, a semiconductor switch that is switched between the on state and the off state in accordance with the signal inputted thereto.

The outboard motor 1 according to the third preferred embodiment explained above also achieves advantageous effects similar to those achieved by the outboard motor 1 according to the first or second preferred embodiments. Additionally, in the outboard motor 1 according to the third preferred embodiment, even when the switch 22 is turned to the off state and electric power supply to the electric supply port 14 is interrupted, the switch 22 is then automatically returned from the off state to the on state in response to a reduction in the value of electric current. Accordingly, electric power is supplied again to the accessory device 100. Therefore, even when the switch 22 is in a location such as the interior of the cowl 8, which is not easily accessible from the outside, electric power is supplied easily and reliably to the accessory device 100 on the watercraft.

Figure 7:
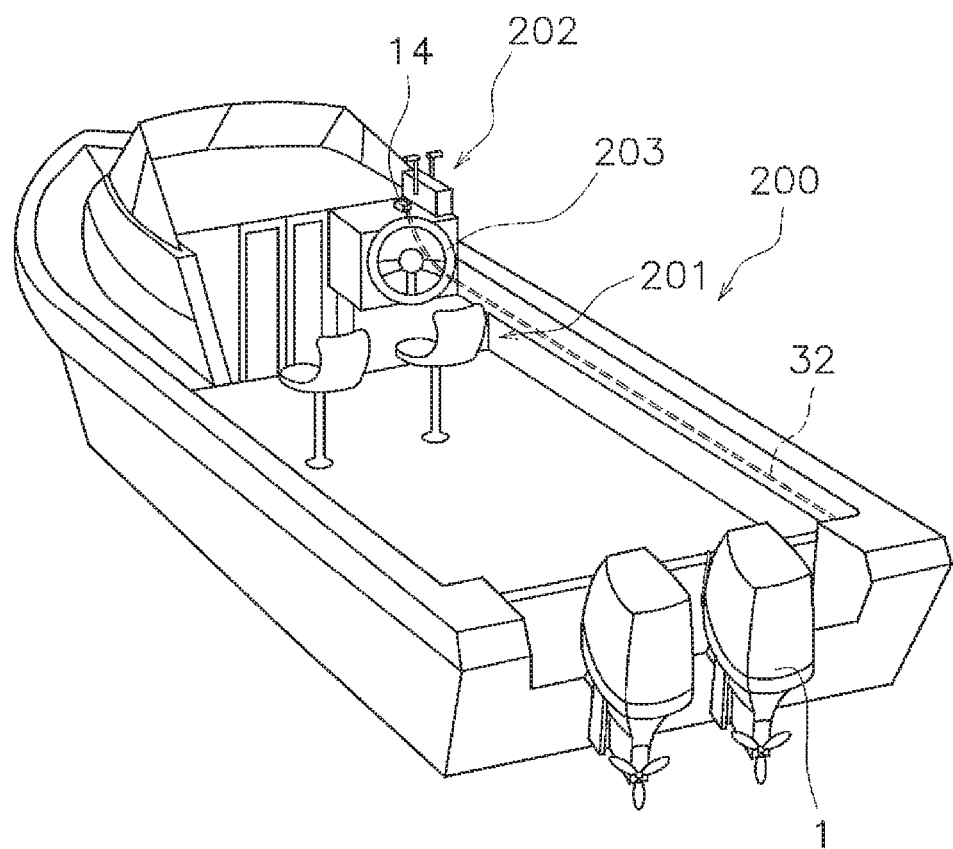
FIG. 7 is a perspective view of an outboard motor according to a fourth preferred embodiment of the present invention and a watercraft.

In the above-described preferred embodiments, the electric supply port 14 is preferably disposed on the cowl 8 of the outboard motor 1. However, the electric supply port 14 may be disposed outside the cowl 8 or the housing 9 of the outboard motor 1. FIG. 7 is a perspective view of an outboard motor 1 according to a fourth preferred embodiment of the present invention and a watercraft 200. The outboard motor 1 is attached to the watercraft 200. The watercraft 200 includes a cockpit 201. A remote control 202 is disposed in the cockpit 201 in order to operate the output of the outboard motor 1. A steering device 203 is disposed in the cockpit 201 in order to steer the watercraft 200.

The outboard motor 1 includes a cable 32. The electric supply port 14 is disposed in a remote location from the outboard motor 1 within the watercraft 200. The cable 32 extends from the outboard motor 1 within the watercraft 200, and the electric supply port 14 is connected to the electric circuit 18 through the cable 32. The electric supply port 14 is located in, for instance, the cockpit 201. Alternatively, the electric supply port 14 may be in another location within the watercraft 200.

In the outboard motor 1 according to the fourth preferred embodiment explained above, the electric supply port 14 is able to be disposed in a desired location within the watercraft 200, or alternatively, may be disposed in a location outside the cowl 8 and the housing 9 such as the tiller handle attached to the outboard motor 1. Therefore, flexibility in the layout of the electric supply port 14 is enhanced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   a mechanical power source;
   a drive shaft driven by the mechanical power source and extending downwardly from the mechanical power source;
   a propeller shaft connected to the drive shaft and extending in a direction intersecting an axis of the drive shaft;
   an electric power source;
   a mechanical power source auxiliary machine that assists driving the mechanical power source;
   an electric circuit electrically connecting the electric power source and the mechanical power source auxiliary machine;
   an electric supply port electrically connected to the electric power source through the electric circuit, the electric supply port supplying an electric power to an accessory device to be connected to the electric supply port; and
   a switch disposed between the electric power source and the electric supply port in the electric circuit, the switch being switchable between an on state and an off state, the switch allowing a flow of an electric current when switched to the on state and interrupting the flow of the electric current when switched to the off state, the switch being switched from the on state to the off state due to an excessive electric current, and the switch being returnable from the off state to the on state.

2. The outboard motor according to claim 1, further comprising:
   a cowl accommodating the mechanical power source; wherein
   the electric supply port is attached to the cowl.

3. The outboard motor according to claim 2, wherein the cowl includes:
   a bottom cowl; and
   a top cowl disposed above the bottom cowl and detachably attached to the bottom cowl; and
   the electric supply port is attached to the bottom cowl.

4. The outboard motor according to claim 3, wherein the electric supply port is attached to a front portion of the bottom cowl.

5. The outboard motor according to claim 2, wherein the electric supply port is attached to an outer surface of the cowl.

6. The outboard motor according to claim 1, further comprising:
   a waterproof cap detachably attached to the electric supply port.

7. The outboard motor according to claim 1, further comprising:
   a cowl accommodating the mechanical power source;
   a housing accommodating the drive shaft and the propeller shaft; and
   a cable connected to the electric circuit; wherein
   the electric supply port is disposed outside the cowl and the housing and connected to the electric circuit through the cable.

8. The outboard motor according to claim 1, further comprising:
   a cowl accommodating the mechanical power source; wherein
   the switch includes a circuit breaker and an operating member that is manually switched from the off state to the on state; and
   the operating member is attached to the cowl and accessible from outside the cowl.

9. The outboard motor according to claim 8, wherein the cowl includes:
   a bottom cowl; and
   a top cowl disposed above the bottom cowl and detachably attached to the bottom cowl; and
   the operating member is attached to the bottom cowl.

10. The outboard motor according to claim 9, wherein the operating member is attached to a front portion of the bottom cowl.

11. The outboard motor according to claim 8, wherein the operating member is attached to an outer surface of the cowl.

12. The outboard motor according to claim 1, further comprising:
    a sensor that detects a value of the electric current in the electric circuit; wherein
    the switch is switched between the on state and the off state in accordance with a signal inputted to the switch from the sensor.

* * * * *